United States Patent
Azizi et al.

(10) Patent No.: US 10,127,693 B2
(45) Date of Patent: *Nov. 13, 2018

(54) DIMENSIONAL DATA CHART MATRIXES WITH DRILL OPERATIONS

(71) Applicant: International Business Machines Corporation, Armonk, NY (US)

(72) Inventors: Soufiane Azizi, Nepean (CA); Bryan Casey, Ottawa (CA); Alexei Pogrebtsov, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/712,737

(22) Filed: Dec. 12, 2012

(65) Prior Publication Data

US 2014/0160131 A1  Jun. 12, 2014

(51) Int. Cl.
*G06T 11/20* (2006.01)
*G06F 17/30* (2006.01)
*G06F 3/0484* (2013.01)

(52) U.S. Cl.
CPC ........ *G06T 11/206* (2013.01); *G06F 3/04842* (2013.01); *G06F 17/30395* (2013.01);
(Continued)

(58) Field of Classification Search
CPC ... G06T 11/206; G06T 2200/24; G06F 3/048; G06F 9/4443; G06F 17/30716;
(Continued)

(56) References Cited

U.S. PATENT DOCUMENTS 6,707,454 B1 * 3/2004 Barg ..................... G06F 17/246
345/440
6,906,717 B2  6/2005 Couckuyt et al.
(Continued)

OTHER PUBLICATIONS

Jiang Du et al., "Visual Guidance in the Exploration of Large Databases," Proceedings of the 2010 Conference of the Center for Advanced Studies on Collaborative Research, downloaded from http://profs.etsmtl.ca/mmcguffin/research/2010-du-cascon/du-cascon2010-visualGuidance.pdf (11 pages) (2010).
(Continued)

*Primary Examiner* — Gregory J Tryder
*Assistant Examiner* — Scott E Sonners
(74) *Attorney, Agent, or Firm* — Shumaker & Sieffert, P.A.

(57) ABSTRACT

A computing device outputs a chart matrix defined by associating a first data dimension with a row edge and a second data dimension with a column edge. Members of the first data dimension are displayed as row headers of the chart matrix, and members of the second data dimension are displayed as column headers of the chart matrix. The device outputs charts in matrix cells of the chart matrix defined by intersections of rows defined by the row edge and columns defined by the column edge. The computing device provides user options to perform a drill operation on a selected member displayed in the chart matrix. The computing device outputs, in response to the user input to perform the drill operation, a modified chart matrix displaying related members in at least one of the charts, wherein the related members are related by one hierarchical level from the selected member.

18 Claims, 7 Drawing Sheets

(52) U.S. Cl.
CPC .. *G06F 17/30398* (2013.01); *G06F 17/30554* (2013.01); *G06F 17/30592* (2013.01); *Y10S 715/968* (2013.01)

(58) Field of Classification Search
CPC ........... G06F 3/04842; G06F 17/30554; G06F 17/30592; G06F 17/30958
USPC ........................................................ 345/440
See application file for complete search history.

(56) References Cited

U.S. PATENT DOCUMENTS

| | | | |
|---|---|---|---|
| 6,995,768 | B2 | 2/2006 | Jou et al. |
| 7,089,266 | B2 * | 8/2006 | Stolte ................ G06F 17/30592 707/769 |
| 8,122,337 | B2 | 2/2012 | MacGregor et al. |
| 2005/0080802 | A1 | 4/2005 | Gras et al. |
| 2006/0206512 | A1 * | 9/2006 | Hanrahan et al. ............ 707/102 |
| 2009/0217147 | A1 | 8/2009 | Thomsen |
| 2010/0125779 | A1 | 5/2010 | Choudhury |
| 2012/0102396 | A1 | 4/2012 | Arksey et al. |

OTHER PUBLICATIONS

Johannes Kehrer et al., "Visualization and Visual Analysis of Multi-faceted Scientific Data: a Survey," IEEE Transactions on Visualization and Computer Graphics, Apr. 10, 2012, IEEE Computer Society Digital Library, IEEE Computer Society, pp. 1-20.
"Business Objects User's Guide: Accessing Data and Data Analysis," Chapter 10, Slice and Dice Mode (pp. 271-293) (2003).
IBM Cognos Business Insight Advanced User Guide (235 pages) (2005) downloaded from http://www.maine.edu/pdf/BusinessInsightAdvancedUserGuide.pdf.
Response to Office Action dated Apr. 16, 2015, from U.S. Appl. No. 14/226,747, filed Jul. 14, 2015, 7 pp.
Office Action from U.S. Appl. No. 14/226,747, dated Apr. 16, 2015, 13 pp.
Final Office Action from U.S. Appl. No. 14/226,747, dated Oct. 16, 2015, 15 pp.
Response After Final Action from U.S. Appl. No. 14/226,747, filed Dec. 16, 2015 7 pp.
Office Action from U.S. Appl. No. 14/226,747, dated Apr. 7, 2016, 20 pp.
Response to Advisory Action dated Feb. 2, 2016, from U.S. Appl. No. 14/226,747, filed Mar. 1, 2016, 7 pp.
Response to the Office Action dated Apr. 7, 2016, from U.S. Appl. No. 14/226,747, filed Jul. 7, 2016, 13 pp.
Response to Final Office Action from U.S. Appl. No. 14/226,747 dated Nov. 14, 2016, filed Mar. 14, 2017 16 pgs.
Final Office Action from U.S. Appl. No. 14/226,747, dated Nov. 14, 2016, 28 pp.
Office Action from U.S. Appl. No. 14/226,747, dated Jun. 6, 2017, 28 pp.
Amendment in Response to Office Action dated Jun. 6, 2017, from U.S. Appl. No. 14/226,747, filed Aug. 24, 2017, 16 pp.
Final Office Action from U.S. Appl. No. 14/226,747, dated Dec. 8, 2017, 39 pp.
Response to Final Office Action dated Dec. 8, 2017, from U.S. Appl. No. 14/226,747, filed Dec. 28, 2017, 13 pp.
Office Action from U.S. Appl. No. 14/226,747, dated Feb. 7, 2018, 24 pp.
Response to Office Action dated Feb. 7, 2018, from U.S. Appl. No. 14/226,747, filed May 7, 2018, 13 pp.
Notice of Allowance from U.S. Appl. No. 14/226,747, dated Jun. 13, 2018, 12 pgs.

* cited by examiner

300

302: OUTPUT A CHART MATRIX DEFINED BY ASSOCIATING A FIRST DATA DIMENSION WITH A ROW EDGE AND A SECOND DATA DIMENSION WITH A COLUMN EDGE, WHEREIN MEMBERS OF THE FIRST DATA DIMENSION ARE DISPLAYED AS ROW HEADERS OF THE CHART MATRIX, AND MEMBERS OF THE SECOND DATA DIMENSION ARE DISPLAYED AS COLUMN HEADERS OF THE CHART MATRIX

304: OUTPUT ONE OR MORE CHARTS IN ONE OR MORE MATRIX CELLS OF THE CHART MATRIX, WHEREIN THE CELLS OF THE CHART MATRIX ARE DEFINED BY ONE OR MORE INTERSECTIONS OF ROWS DEFINED BY THE ROW EDGE AND COLUMNS DEFINED BY THE COLUMN EDGE

306: PROVIDE A USER OPTION TO PERFORM A DRILL OPERATION ON A SELECTED MEMBER DISPLAYED IN THE CHART MATRIX

308: OUTPUT, IN RESPONSE THE USER INPUT TO PERFORM THE DRILL OPERATION, A MODIFIED CHART MATRIX DISPLAYING RELATED MEMBERS IN AT LEAST ONE OF THE ONE OR MORE CHARTS, WHEREIN THE RELATED MEMBERS ARE RELATED BY ONE HIERARCHICAL LEVEL FROM THE SELECTED MEMBER

FIG. 6

DIMENSIONAL DATA CHART MATRIXES WITH DRILL OPERATIONS

TECHNICAL FIELD

The invention relates to enterprise software systems, and more particularly, to accessing dimensional data maintained by enterprise software systems.

BACKGROUND

Enterprise software systems are typically sophisticated, large-scale systems that support many, e.g., hundreds or thousands, of concurrent users. Examples of enterprise software systems include business intelligence and business analytics tools, financial planning systems, budget planning systems, order management systems, inventory management systems, sales force management systems, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by other users. Using the results of these calculations, the system may generate reports for review by higher management. Often these complex systems make use of dimensional data sources that organize and manipulate a potentially tremendous volume of data using various data structures. Dimensional data sources may include a plurality of hierarchical dimensions having levels and members for storing dimensional data.

Reporting and analysis end user products (typically referred to as Business Intelligence, or BI, tools) allow users to perform data exploration and analysis on a myriad of data sources, including dimensional data sources. Data from such dimensional data sources may be viewed and explored in forms such as grids and charts.

SUMMARY

In one example, a method includes outputting a chart matrix defined by associating a first data dimension with a row edge and a second data dimension with a column edge, wherein members of the first data dimension are displayed as row headers of the chart matrix, and members of the second data dimension are displayed as column headers of the chart matrix. The method further includes outputting one or more charts in one or more matrix cells of the chart matrix, wherein the cells of the chart matrix are defined by one or more intersections of rows defined by the row edge and columns defined by the column edge. The method further includes providing a user option to perform a drill operation on a selected member displayed in the chart matrix. The method further includes outputting, by the computing device, in response to the user input to perform the drill operation, a modified chart matrix displaying related members in at least one of the one or more charts, wherein the related members are related by one hierarchical level from the selected member.

In another example, a computing system includes at least one processor. The at least one processor is configured to output a chart matrix defined by associating a first data dimension with a row edge and a second data dimension with a column edge, wherein members of the first data dimension are displayed as row headers of the chart matrix, and members of the second data dimension are displayed as column headers of the chart matrix. The at least one processor is further configured to output one or more charts in one or more matrix cells of the chart matrix, wherein the cells of the chart matrix are defined by one or more intersections of rows defined by the row edge and columns defined by the column edge. The at least one processor is further configured to provide a user option to perform a drill operation on a selected member displayed in the chart matrix. The at least one processor is further configured to output, in response to the user input to perform the drill operation, a modified chart matrix displaying related members in at least one of the one or more charts, wherein the related members are related by one hierarchical level from the selected member.

In another example, a computer program product includes one or more computer-readable tangible storage devices and program instructions stored on at least one of the one or more computer-readable tangible storage devices. The computer program product includes program instructions, stored on at least one of the one or more computer-readable tangible storage devices, to output a chart matrix defined by associating a first data dimension with a row edge and a second data dimension with a column edge, wherein members of the first data dimension are displayed as row headers of the chart matrix, and members of the second data dimension are displayed as column headers of the chart matrix. The computer program product further includes program instructions, stored on at least one of the one or more computer-readable tangible storage devices, to output one or more charts in one or more matrix cells of the chart matrix, wherein the cells of the chart matrix are defined by one or more intersections of rows defined by the row edge and columns defined by the column edge. The computer program product further includes program instructions, stored on at least one of the one or more computer-readable tangible storage devices, to provide a user option to perform a drill operation on a selected member displayed in the chart matrix. The computer program product further includes program instructions, stored on at least one of the one or more computer-readable tangible storage devices, to output, in response to the user input to perform the drill operation, a modified chart matrix displaying related members in at least one of the one or more charts, wherein the related members are related by one hierarchical level from the selected member.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 6 is a flowchart illustrating operation of an example method for performing drill operations in chart matrixes in a BI application with drillable chart matrixes.

DETAILED DESCRIPTION

There are set forth herein examples of a method, computing system, and computer program product for providing a BI application with drillable chart matrixes. Various embodiments disclosed herein may enable users to create and operate drillable matrixes of charts to represent and analyze data in a BI application. For example, a BI application with drillable chart matrixes may enable drill-up and drill-down operations in a matrix of charts, thereby providing easier and more rapid visualization and analysis of complex data sets.

A BI application with drillable chart matrixes as disclosed herein may enable users to create and operate chart matrixes with drill-up and drill-down features. Techniques of this disclosure enable drill-up and drill-down operations on related members in hierarchies in a chart matrix, i.e., a matrix of charts. Drill-up and drill-down operations in a chart matrix may facilitate exploration and visualizing multiple dimensions of data represented in chart matrixes, where each chart matrix includes a matrix view of multiple charts. Drill-up and drill-down operations in a chart matrix may maintain the context and relationships between charts from one chart matrix to another chart matrix as the drill operations are performed. Various illustrative features and advantages of a BI application with drillable chart matrixes are further described below with reference to FIGS. 1-7.

Figure 1:
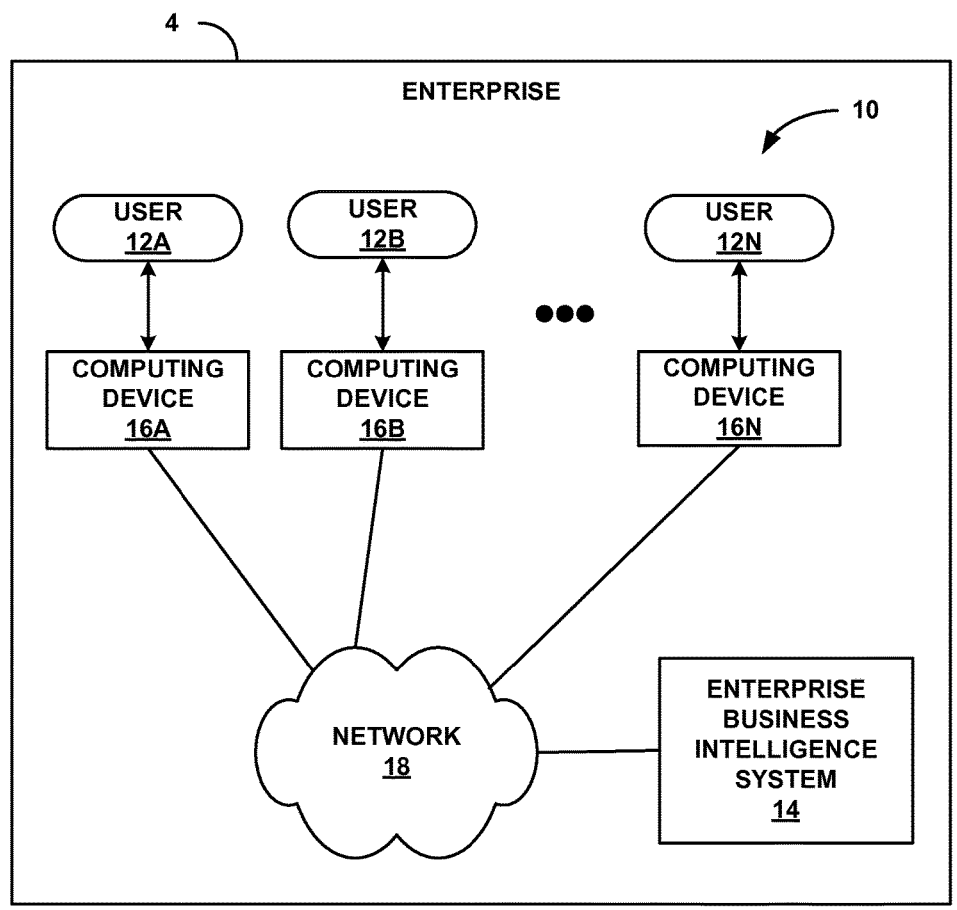
FIG. 1 is a block diagram illustrating an example enterprise having a computing environment in which a plurality of users interacts with an enterprise business intelligence (BI) system.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") interact with an enterprise business intelligence system 14. In the system shown in FIG. 1, enterprise business intelligence system 14 is communicatively coupled to a number of computing devices 16A-16N (collectively, "computing devices 16") by a network 18. Users 12 interact with their respective computing devices 16 to access enterprise business intelligence system 14.

For exemplary purposes, one example of the techniques of this disclosure is described in reference to an enterprise business intelligence (BI) system, such as financial or budget planning systems, inventory management systems, sales force management systems, business intelligence tools, enterprise reporting tools, enterprise order management systems, project and resource management systems, and other enterprise software systems. The techniques described herein may be readily applied to other software systems, including other large-scale enterprise software systems.

Typically, users 12 view and manipulate dimensional data via respective computing devices 16. The data is dimensional in that each dimensional data element is defined by a plurality of different object types, where each object is associated with a different dimension. Users 12 may, for example, use a dimensional data analysis interface on computing devices 16 to interact with a BI application to perform activities such as analyze data and author reports. A BI application may be enabled to display dimensional data in any of various forms, such as grids, charts, and matrixes of charts, i.e., chart matrixes. A BI application of the present disclosure may be enabled for drillable chart matrixes so a user 12 may perform drill operations, including drill-up and drill-down operations, on chart matrixes.

Enterprise users 12 may use a variety of different types of computing devices 16 to interact with enterprise business intelligence system 14 via network 18. For example, an enterprise user 12 may interact with enterprise business intelligence system 14 using a laptop computer, desktop computer, or the like, running either a web browser or a dedicated client application. Alternatively, an enterprise user may use a mobile device such as a tablet computer or smartphone, running either a web browser or a dedicated mobile device application for interacting with enterprise business intelligence system 14.

Network 18 represents any communication network, such as a packet-based digital network like a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
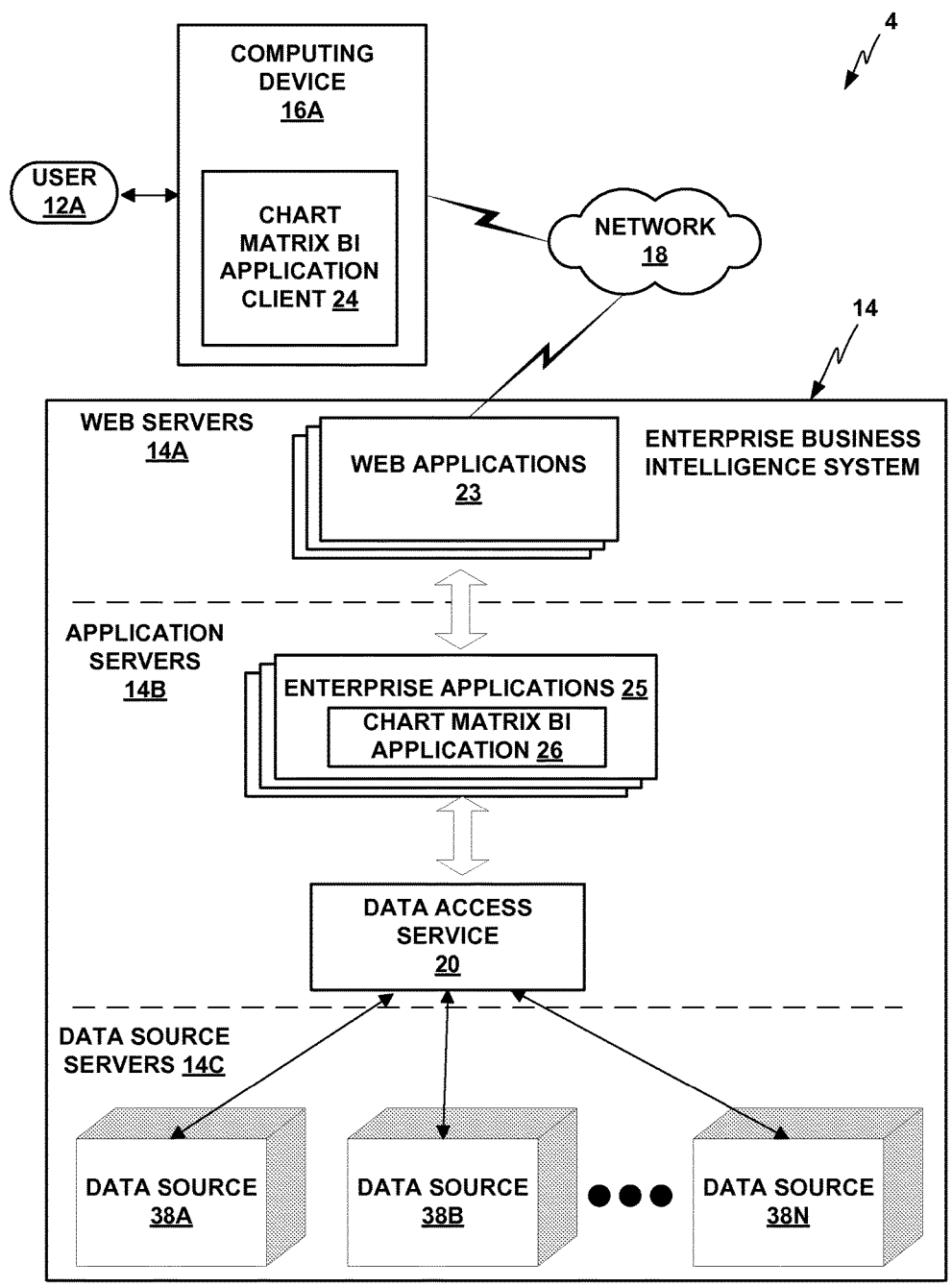
FIG. 2 is a block diagram illustrating an example enterprise business intelligence (BI) system with a business intelligence (BI) application with drillable chart matrixes.

FIG. 2 is a block diagram illustrating in further detail portions of one example embodiment of an enterprise business intelligence system 14. Enterprise business intelligence system 14 is implemented in accordance with a three-tier architecture: (1) one or more web servers 14A that provide user interface functions; (2) one or more application servers 14B that provide an operating environment for business logic and enterprise software applications 25, including drillable chart matrix BI application 26, i.e., a BI application of the present disclosure enabled for drillable chart matrixes; (3) and one or more data source servers 14C. The data source servers 14C host data sources 38A, 38B, . . . 38N ("data sources 38A-38N") which may include dimensional data sources, relational databases, multidimensional databases, and/or other data sources. The data sources 38A-38N may be implemented using a variety of vendor platforms, and may be distributed throughout the enterprise.

As one example, the data sources 38A-38N may include multidimensional databases configured for Online Analytical Processing (OLAP). As another example, the data sources 38A-38N may include multidimensional databases configured to receive and execute Multidimensional Expression (MDX) queries of some arbitrary level of complexity. As yet another example, the data sources 38A-38N may include two-dimensional relational databases configured to receive and execute SQL queries, also with an arbitrary level of complexity. Some of data sources 38A-38N may include other types of data stores or combine aspects of multiple types of data stores.

As described in further detail below, the drillable chart matrix BI application 26 may access one or more selected sources of data in data sources 38A-38N. Enterprise business intelligence system 14 includes a data access service 20 that provides a logical or easy-to-query interface to the data sources 38A-38N. The data access service 20 may, for example, execute on the application servers 14B intermediate to the enterprise applications 25 and the underlying data sources 38A-38N. The data access service 20 permits the enterprise software applications 25 and drillable chart matrix BI application 26 in particular to access data from data sources 38A-38N without regard to particular query expression features implemented by each of the underlying data sources.

In the example implementation depicted in FIG. 2, a single client computing device 16A is shown for purposes of example. Client computing device 16A includes a drillable chart matrix BI application client 24 configured for interacting with, and rendering a user interface for, drillable chart matrix BI application 26. Drillable chart matrix BI application 26 running on one or more of application servers 14B may provide the underlying user interface for creating and operating chart matrixes enabled for drill-up and drill-down operations on client computing device 16A. Drillable chart matrix BI application 26 provides the data for the client-side rendering of the user interface for drillable chart matrix BI application client 24 and for displaying new chart matrixes based on data indicated by drill-up and drill-down inputs entered to previous chart matrixes.

Figure 4:
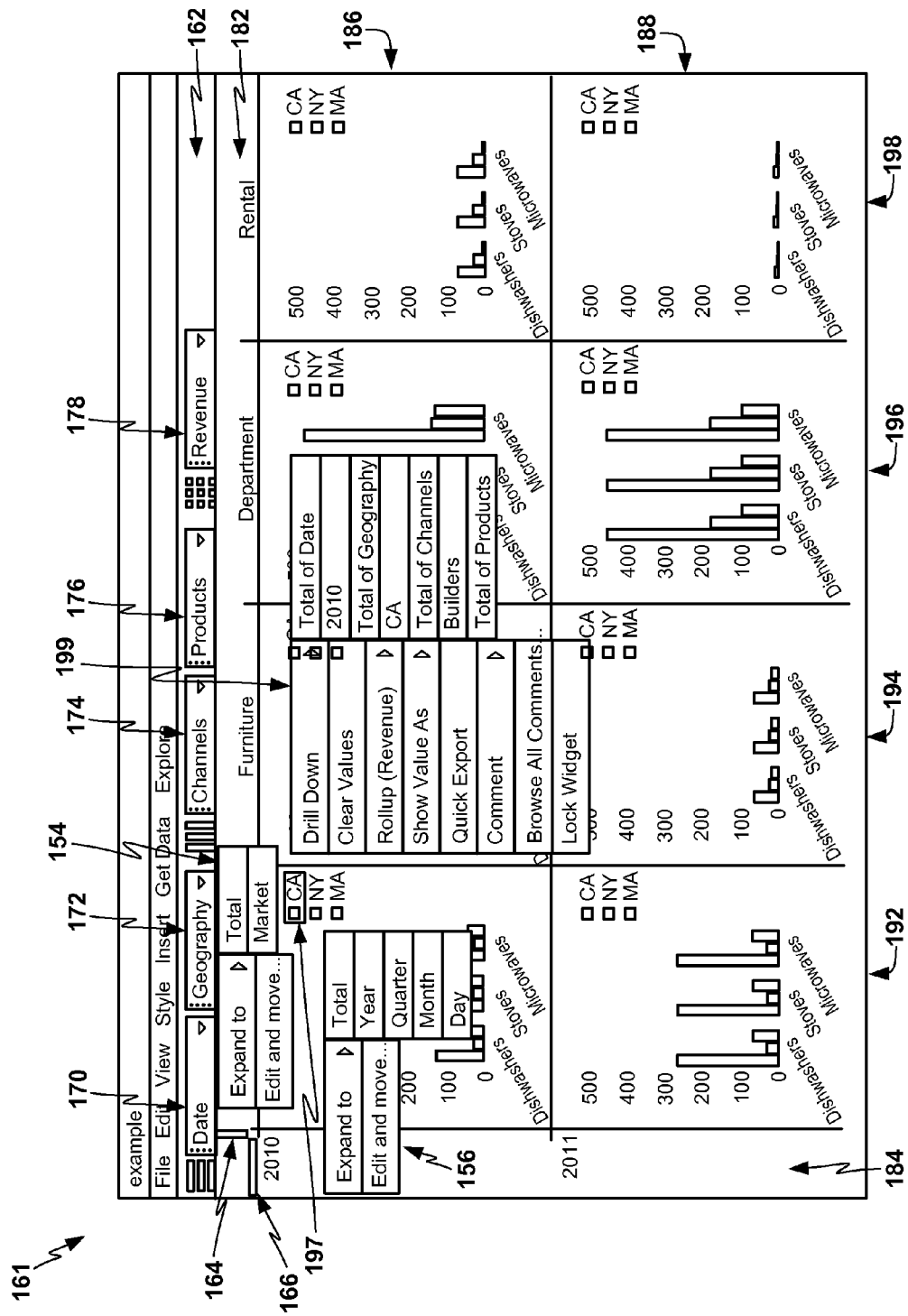
FIG. 4 depicts a screenshot of another example drillable chart matrix user interface for a drillable chart matrix BI application, as it may be displayed on a display screen of a client computing device.
Figure 5:
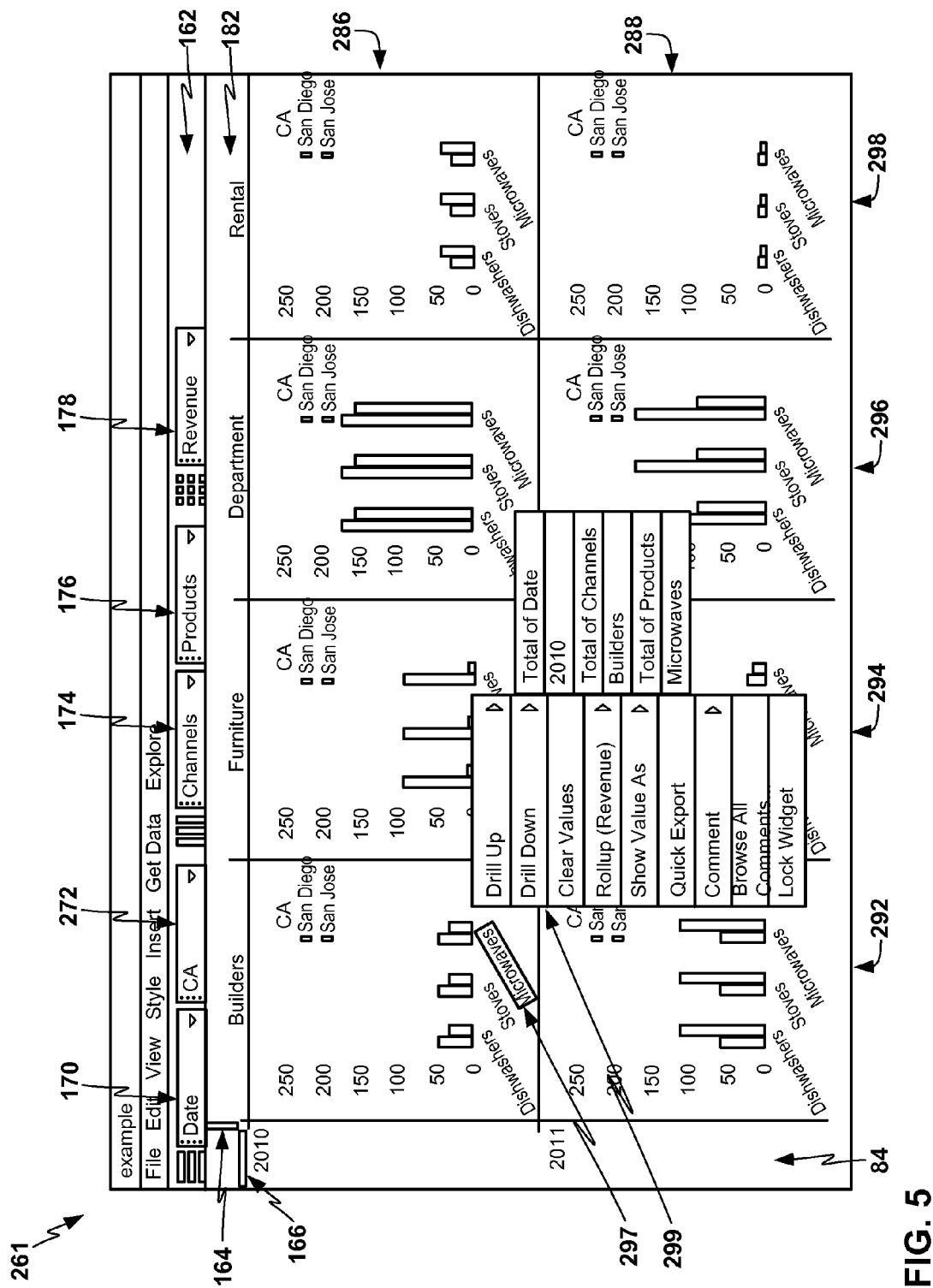
FIG. 5 depicts a screenshot of another example drillable chart matrix user interface for a drillable chart matrix BI application, as it may be displayed on a display screen of a client computing device.

Drillable chart matrix BI application 26 may also include, or provide the back end or other program code or data for, a web application implementation of drillable chart matrix BI application client 24. One or more web servers 14A may provide an operating environment for web applications 23 that provide user interface functions to computer device 16A. One or more application servers 14B provide an operating environment for enterprise software applications 25 and drillable chart matrix BI application 26 that access data sources 38A-38N through data access service 20. Drillable chart matrix BI application 26 may thereby make use of various resources of enterprise business intelligence system 14 to enable user interaction with drillable chart matrix BI application client 24. Various examples of outputs displayed at a user interface for drillable chart matrix BI application client 24 are illustrated in FIGS. 3-5.

Figure 3:
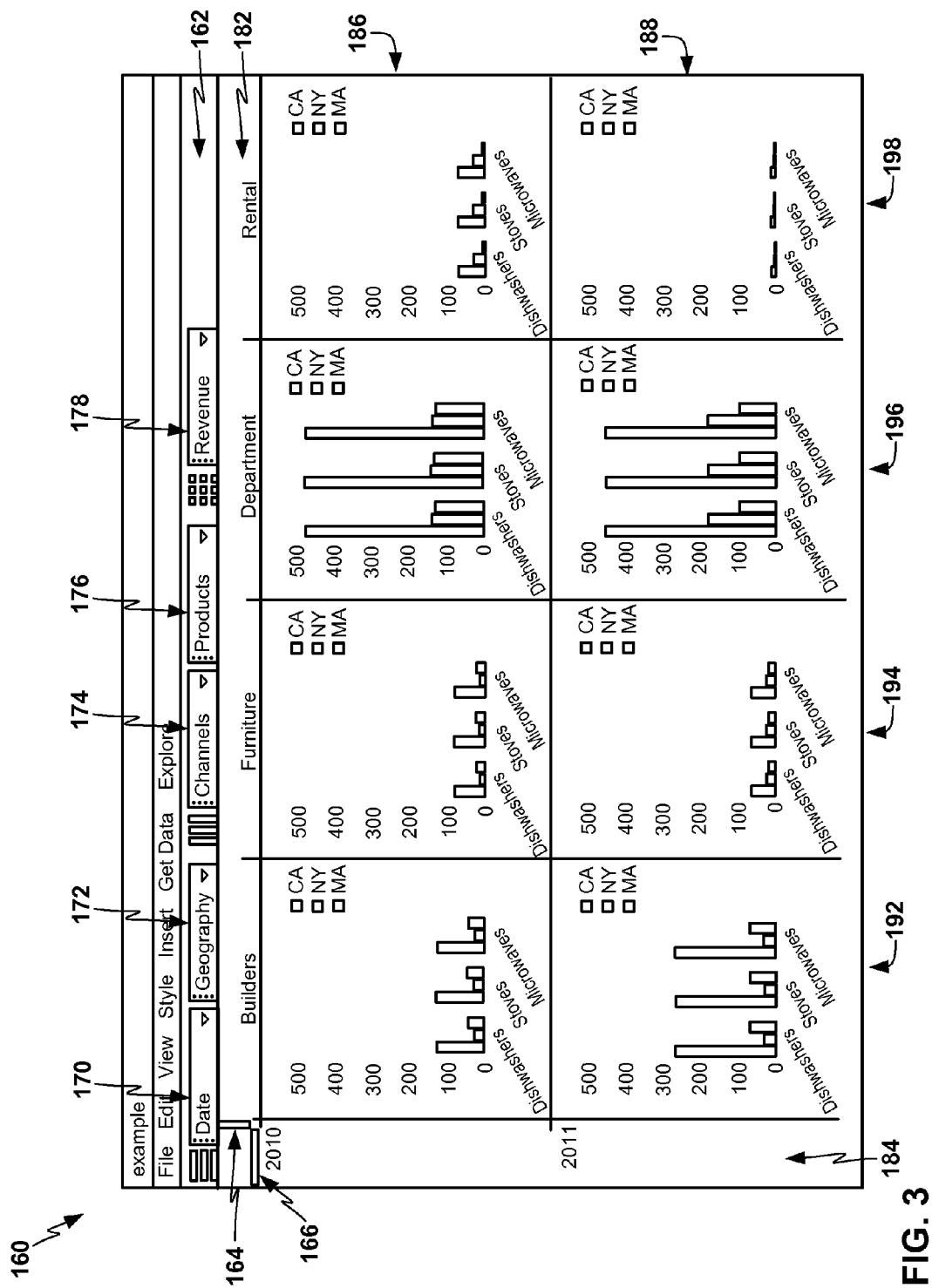
FIG. 3 depicts a screenshot of an example drillable chart matrix user interface for a drillable chart matrix BI application, as it may be displayed on a display screen of a client computing device.

FIG. 3 depicts a screenshot of an example drillable chart matrix user interface 160 for a drillable chart matrix BI application 26, as it may be displayed on a display screen of client computing device 16A as shown in FIG. 2. Drillable chart matrix user interface 160 may be used in exploring, analyzing, and visualizing BI data and authoring BI reports, for example. Drillable chart matrix user interface 160 includes functionalities and user input options to enable drill-up and drill-down operations in chart matrixes representing bodies of dimensional data. Various examples of such functionalities and user input options to enable drill-up and drill-down operations in chart matrixes are further described below.

Drillable chart matrix user interface 160 includes various dimensions of data, including a date dimension 170, a geography dimension 172, a channels dimension 174 (i.e., for sales channels), a products dimension 176, and a revenue dimension 178. Date dimension 170 and geography dimension 172 are placed as the first and second dimensions, respectively, in a row header among headers 162. Similarly, channels dimension 174 and products dimension 176 are placed as the first and second dimensions, respectively, in a column header among headers 162. Revenue dimension 178 is placed in a grid header among headers 162, relating to a grid view that is hidden in user interface 160, to emphasize the display of data in the form of a chart matrix, i.e., a matrix of charts. The matrix of charts is defined by the matrix formed among rows 186 and 188, and columns 192, 194, 196, and 198, where each intersection of one of the rows and columns forms a cell of the matrix, each cell of the matrix includes a chart, and each chart displays an ordered representation of dimensional data from an example dimensional data set. The various data dimensions 170, 172, 174, 176, 178 may be placed and rearranged in the different headers 162 by a user interacting with user interface 160, and entering inputs to user-selectable options for arranging the data dimensions in user interface 160.

The ordering of the data dimensions in the row headers and column headers among headers 162 defines a nesting structure of the dimensions. Since the date dimension 170 is positioned as the first data dimension among the row headers, the date dimension forms the row edge 184, with members of a hierarchy of the date dimension populating the headers of the row edge 184. In the example view shown in FIG. 3, the date dimension is set to its highest level of years, and two example years 2010 and 2011 are displayed as members of the top level of the date dimension hierarchy, defining rows 186 and 188. The row edge basis element 166 may provide user options (i.e., user-selectable options, or user-selectable user interface elements enabling a user to select or enter an input or specify an option) for modifying the dimensional data displayed along the row edge, and the column edge basis element 164 may provide user options for modifying the dimensional data displayed along the column edge. Since the geography dimension 172 is positioned as the second dimension among the row headers, members of a hierarchy of the geography dimension populate data within each chart in each cell of the matrix, illustratively indicated with the state codes CA, NY, MA for example states. Similarly for the column headers, since the channels dimension 174 is positioned as the first dimension among the column headers, the channels dimension forms the column edge 182, with members of a hierarchy of the channels dimension populating the headers of the column edge 182. In the example view shown in FIG. 3, the channels dimension is set to its top level of sales channel categories, and four example sales channel categories are displayed as members of the top level of the channel dimension hierarchy, i.e., builders, furniture stores, department stores, and rental properties, defining columns 192, 194, 196, and 198 in the example view of FIG. 3.

Since the geography dimension 172 is positioned as the second dimension among the row headers, members of a hierarchy of the geography dimension populate data extending vertically within each chart in each cell of the matrix, illustratively indicated with the state codes CA, NY, MA for example states. Similarly, since the products dimension 176 is positioned as the second dimension among the column headers, members of a hierarchy of the products dimension populate data extending horizontally within each chart in each cell of the matrix, illustratively indicated as dishwashers, stoves, and microwaves for example products. Various data dimensions are therefore nested together, with one data dimension each forming the row edge 184 and the column edge 182, and other data dimensions populating the data represented in each chart in the matrix of charts defined by the row edge 184 and column edge 182. In other examples, more than one data dimension may be positioned on row edge 184 or column edge 182. In this case, only one innermost data dimension or two or more inner data dimensions may be nested within the multiple data dimensions on row edge 184 or column edge 182 and may populate the charts within the chart matrix. Thus, if there are three or more data dimensions among the row headers, then at least one may be positioned along row edge 184 and at least one positioned within the charts of the chart matrix, with the remaining data dimensions positioned on either the row edge or in the inner position within the charts. The same may apply if there are three or more data dimensions among the column headers.

With the chart matrix of user interface 160 thus defined and populated from the data dimensions positioned in headers 162, the chart matrix of user interface 160 is also enabled for drill operations among any of various data dimensions in both the rows and columns, and among both the edge dimensions, and the inner dimensions represented within each chart of the matrix. The drill operations may include both drill-up and drill-down operations to navigate up and down the hierarchies of any of the data dimensions used in the chart matrix. Examples of drill operations are illustrated in FIGS. 4 and 5.

FIG. 4 depicts a screenshot of another example drillable chart matrix user interface 161 for a drillable chart matrix BI application 26, as it may be displayed on a display screen of client computing device 16A as shown in FIG. 2. Drillable chart matrix user interface 161 shown in FIG. 4 is identical to drillable chart matrix user interface 160 of FIG. 3 except to show a different view of the chart matrix user interface showing a few representative context menus 154, 156, 199 associated with graphical user interface (GUI) elements of drillable chart matrix user interface 161, where the context menus include user options for drill operations, as well as other user options such as for modifying the dimensional data hierarchy displays. Several representative context menus 154, 156, 199 are shown in FIG. 4 for purposes of illustration, while in some examples, a user may typically open a single context menu at a time. As noted above, the row edge basis GUI element 166 may provide user options for modifying the dimensional data displayed along the row edge, and the column edge basis GUI element 164 may provide user options for modifying the dimensional data displayed along the column edge. Context menu 156 may be opened when a user selects row edge basis GUI element 166 (e.g., by double-clicking or right-clicking on GUI element 166), and context menu 154 may be opened when a user selects column edge basis GUI element 164. Context menus 156 and 154 include user options to shift to different hierarchical levels for the dimensions used for the row edge 184 and column edge 186, respectively, as well as user options to edit and move the data dimensions used for the row edge 184 and the column edge 186.

In the example of FIG. 4, a user opens context menu 199 by selecting (e.g., by double-clicking or right-clicking) a geography data member 197 for "CA," i.e., the state of California, in the chart located in the matrix cell at the intersection of row 186 and column 192. Similar context menus may be accessible when a user selects any data member anywhere in the chart matrix of drillable chart matrix user interface 161. Context menu 199 includes several user options, including a user option to "drill down." In the illustrative view of FIG. 4, context menu 199 includes a second menu level opened due to a user having selected the "drill down" option in the first level of context menu 199. The second menu level of context menu 199 provides a number of options for drill-down operations, including drill-down operations in the date, geography, channels, builders, and products data dimensions. A user may, for example, select the menu option labeled "CA" for California to select a geographic drill-down operation, the selection of which modifies the entire chart matrix to drill down in the geographic data dimension for the state of California. The result of this drill-down operation is shown in FIG. 5. Similar user options for drill-down operations may also be selected to drill down into other data dimensions, such as dates, sales channels, and product categories, in this example.

FIG. 5 depicts a screenshot of another example drillable chart matrix user interface 261 for a drillable chart matrix BI application 26, as it may be displayed on a display screen of client computing device 16A as shown in FIG. 2. Drillable chart matrix user interface 261 has a similar structure to the drillable chart matrix user interfaces 160, 161 shown in FIGS. 3 and 4 with the date and geography data dimensions as the first and second row headers, respectively, and the channels and products data dimensions as the first and second column headers, respectively. Drillable chart matrix user interface 261 differs, however, in that the geography data dimension is drilled down to the state level, and to the state of California in particular, as indicated by geography data dimension header 272 among headers 162. The computing device executing drillable chart matrix BI application 26 thus outputs drillable chart matrix user interface 261 in response to the user input to perform the drill operation, as a modified chart matrix displaying related members in at least one of the one or more charts, wherein the related members are related by one hierarchical level from the selected member, i.e. the California state geographical member 197 shown in FIG. 4.

The geography dimension may include the United States of America as a top level, or the world as a top level with different nations as the second level. Different states in the USA may then be either the second or third level, and individual cities may be the next level down from states. With the geography dimension drilled down to California in particular, as indicated by the input received for the corresponding user option, the computing system executing drillable chart matrix BI application 26 updates or modifies each of the charts in the chart matrix for this drill-down operation. In particular, each of the charts is modified to display data only for California, divided among various cities within California. Two representative cities, San Diego and San Jose, are displayed in the simplified representation of FIG. 5, similarly to how only three representative states are displayed in the chart matrixes of FIGS. 3 and 4. User options may enable, in other examples, inputs to display simplified views such as these, or more exhaustive data displays with any number of data dimension members displayed in a chart matrix, such as for dozens of cities in California or for all fifty states in the USA, for example.

In the view of FIG. 5, each chart in the chart matrix now displays representations of data for volumes for the geography dimension at the drilled-down level of cities, as a function of the product dimension, at the level of the representative product categories of dishwashers, stoves, and microwaves. As noted above, the computing system executing drillable chart matrix BI application 26 may update each of the charts in the chart matrix in response to a single drill-down operation on one data member, such that the drillable chart matrix BI application 26 synchronizes the drill operations on all of the charts in a chart matrix in response to a single drill operation user input.

FIG. 5 also shows a context menu 299 displayed in response to a user selection of another data member, the "microwaves" product data member 297 in the chart at the matrix cell formed by the intersection of matrix row 286 and matrix column 292 in the chart matrix. Context menu 299 includes several menu options including both drill-up and drill-down menu options, each of which leads to secondary context menus. In the example shown in FIG. 5, a user has selected the drill-down menu, which has opened multiple drill-down options in the date, channels, and products data dimensions. A user may, for example, select a user option to drill down into the microwaves member in the products dimension and update the chart matrix to display data on microwaves from different manufacturers or other categories of microwaves. In another example, a user may drill up from the microwaves product member to a higher-level product hierarchical level, such as one that includes dishwashers, stoves, and microwaves as part of a single category on par with other broad product categories. In another example, a user may drill up from the geography dimension back into the level of states, or may drill further down on the geography dimension to show individual stores within a particular city, for example. In yet another example, a user may drill down on the date dimension to quarters, months, weeks, or individual days.

A user may continue selecting drill-down operations to the lowest level of one or more data dimensions, which may result in the selected data becoming sufficiently restricted that it no longer includes more than one member along one or more dimensions. In this case, the matrix chart may be modified into a simple chart or even a single chart column or other chart entry. When a chart matrix or other, more simplified data representation is reduced to the lowest hierarchical level in a given data dimension, the available drill operations may default to a drill-up operation. Similarly, at the top hierarchical level of a dimension, the available drill options may only include or may default to a drill-down operation.

A user may also enter user inputs to modify the arrangement of the dimensions over the chart matrix, such as by moving the geography dimension to the row edge and the date dimension to the nested second position in the row headers, or by moving revenue into the column headers, resulting in more complex charts showing charts with three data dimensions in each of the matrix cells of the chart matrix, for example.

FIG. 6 is a flowchart illustrating operation of an example method 300 for enabling the creation and use of drillable chart matrix representations of dimensional data, such as may be performed by drillable chart matrix BI application 26 depicted in FIG. 2. Drillable chart matrix BI application 26 may provide, via a user input device such as computing device 16A, a drillable chart matrix user interface such as that depicted in screenshots 160, 161, 261 of FIGS. 3-5, for creating and using drillable chart matrixes enabled by drillable chart matrix BI application 26. Drillable chart matrix BI application 26 may run entirely on a single server or other computing device, for example, and may send data via a network interface or other output component for rendering or populating a user interface at a client computing device 16A, for example.

In the example of FIG. 6, a computing device, such as one or more of application servers 14B of FIG. 2 executing drillable chart matrix BI application 26, outputs a chart matrix defined by associating a first data dimension with a row edge and a second data dimension with a column edge, wherein members of the first data dimension are displayed as row headers of the chart matrix, and members of the second data dimension are displayed as column headers of the chart matrix (302). In this context, referring to the "first" data dimension and the "second" data dimension are understood to be arbitrary and interchangeable labels to distinguish among various data dimensions, and do not refer to intrinsic properties of the data dimensions. The computing device outputs one or more charts in one or more matrix cells of the chart matrix, wherein the cells of the chart matrix are defined by one or more intersections of rows defined by the row edge and columns defined by the column edge (304). The computing device provides a user option to perform a drill operation on a selected member displayed in the chart matrix (306). The computing device then outputs, in response to the user input to perform the drill operation, a modified chart matrix displaying related members in at least one of the one or more charts, wherein the related members are related by one hierarchical level from the selected member (308), as described above with reference to FIGS. 4 and 5, and the selection of the California geographical member to drill down to the related lower-level geographical city members shown in FIG. 5.

Figure 7:
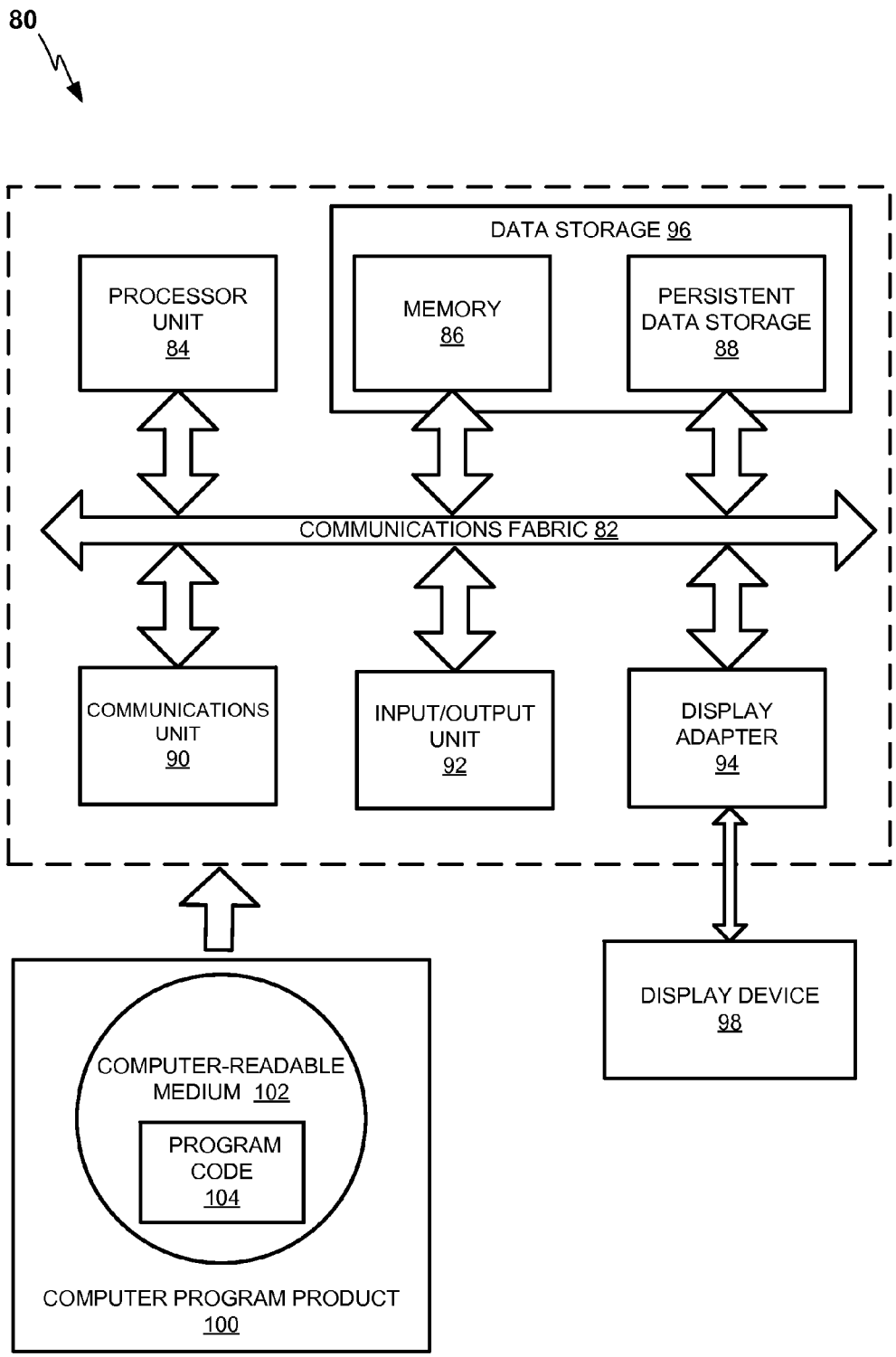
FIG. 7 is a block diagram of an example computing device that may run a BI application with drillable chart matrixes.

FIG. 7 is a block diagram of a computing device 80 that may be used to run a BI application with drillable chart matrixes, according to an illustrative example. The BI application with drillable chart matrixes may enable creation and operation of drillable matrixes of charts either by incorporating this capability within a single application, or by making calls or requests to or otherwise interacting with any of a number of other modules, libraries, data access services, indexes, databases, servers, or other computing environment resources, for example. Computing device 80 may be a workstation, server, mainframe computer, notebook or laptop computer, desktop computer, tablet, smartphone, feature phone, or other programmable data processing apparatus of any kind Computing device 80 of FIG. 7 may represent any of application servers 14B, web servers 14A, or computing devices 16A-16N as depicted in FIGS. 1 and 2, for example. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may include one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity in FIG. 7, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files that include program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a BI application with drillable chart matrixes, as described in greater detail above. This program code may be stored on memory 86, persistent data storage 88, or elsewhere in computing device 80. This program code may also take the form of program code 104 stored on computer-readable medium 102 that is included in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including a display screen for displaying a user interface (e.g., as shown in UI screenshots 160, 161, 261 of FIGS. 3-5) for a drillable chart matrix BI application 26 as shown in FIG. 2. It will be understood that some of these examples may overlap with example components of communications unit 90 or input/output unit 92. Input/output unit 92 may also include appropriate device drivers for any type of external device, or such device drivers may reside in the operating system or elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a BI application with drillable chart matrixes, as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions included in program code 104.

In some illustrative examples, program code 104 may be downloaded or otherwise accessed over a network to data storage 96 from another device or computer system, such as a server, for use within computing device 80. Program code 104 that includes computer-executable instructions may be communicated or transferred to computing device 80 from computer-readable medium 102 through a hard-line or wireless communications link to communications unit 90 and/or through a connection to input/output unit 92. Computer-readable medium 102 that includes program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including Java, Smalltalk, C, C++, Objective-C, C#, Python, or Ruby, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A computing device, comprising:
   at least one processor; and
   at least one memory operably coupled to the at least one processor,
   wherein the at least one processor is configured to:
   output a user interface comprising a row header user interface section, a column header user interface section, and a grid header user interface section, the user interface enabling a user to place selected data dimensions into the row header user interface section, the column header user interface section, and the grid header user interface section;
   associate a first grid data dimension with a first position in the grid header user interface section;
   associate a first row data dimension with a first position in the row header user interface section, wherein the first row data dimension includes a plurality of members arranged in two or more levels in a hierarchy of members;
   associate a first column data dimension with a first position in the column header user interface section, wherein the first column data dimension includes a plurality of members arranged in two or more levels in a hierarchy of members;
   associate a second data dimension with a second position in one of the row header user interface section and the column header user interface section, wherein the second data dimension includes a plurality of members arranged in two or more levels in a hierarchy of members;

output a chart matrix having column headers, row headers and a plurality of cells arranged in rows and columns, the chart matrix defined by members of the first row data dimension at a selected level of the hierarchy of members of the first row data dimension and by members of the first column data dimension at a selected level of the hierarchy of members of the first column data dimension, wherein labels associated with members of the first row data dimension at the selected level of the hierarchy of members of the first row data dimension are displayed as row headers for each of the rows of the chart matrix, and wherein labels associated with members of the first column data dimension at the selected level of the hierarchy of members of the first column data dimension are displayed as column headers for each of the columns of the chart matrix, wherein the cells of the chart matrix are defined by intersections of rows defined by the members of the first row data dimension at the selected level of the hierarchy of members of the first row data dimension with columns defined by the members of the first column data dimension at the selected level of the hierarchy of members of the first column data dimension;

output, for each cell in the chart matrix, an initial chart depicting data corresponding to the first grid data dimension for each member of the second data dimension at a selected level of the hierarchy of members of the second data dimension, the initial chart further based on the member of the first row data dimension that defines the row of the cell and on the member of the first column data dimension that defines the column of the cell, wherein outputting the initial chart includes displaying, in each cell in the chart matrix, a first plurality of labels corresponding to members of the second data dimension at the selected level of the hierarchy of members of the second data dimension;

perform a drill operation on a selected member of the second data dimension, wherein performing the drill operation includes selecting a label of the first plurality of labels displayed in each cell of the chart matrix that corresponds to the selected member of the second data dimension to provide a context menu, each label in the first plurality of labels corresponding to a respective member of the members of the second data dimension at the selected level of the hierarchy of members of the second data dimension, the context menu displaying an option in the first row data dimension, an option in the first column data dimension, and an option in the second data dimension, wherein performing the drill operation includes selecting the option in the second data dimension; and output, in response to the drill operation, a modified chart for each cell based on members related to the selected member, wherein the members related to the selected member are one hierarchical level removed from the selected member in the data dimension containing the selected member and wherein outputting the modified chart includes displaying, in each cell in the chart matrix, a second plurality of labels corresponding to the members related to the selected member that are one hierarchical level removed from the selected member in the data dimension containing the selected member.

2. The computing device of claim 1, wherein the drill operation comprises a drill-down operation, and the members related to the selected member are related by one hierarchical level down from the selected member in the data dimension of the selected member.

3. The computing device of claim 1, wherein the drill operation comprises a drill-up operation, and the members related to the selected member are related by one hierarchical level up from the selected member in the data dimension of the selected member.

4. The computing device of claim 1, wherein the selected member is displayed, in response to the drill operation, in the row header user interface section or the column header user interface section.

5. The computing device of claim 1, wherein the at least one processor is configured to output the user interface such that the data dimensions for placing into the row header user interface section, the column header user interface section, and the grid header user interface section comprise a date dimension, a geography dimension, a revenue dimension, a products dimension, and a non-geographically-defined sales channels dimension that comprises one or more categories of stores and one or more categories of non-store sales channels.

6. The computing device of claim 5, wherein the sales channels dimension comprises two or more of a sales channel for builders, a sales channel for furniture stores, a sales channel for department stores, and a sales channel for rental properties.

7. The computing device of claim 1, wherein the at least one processor is further configured to update each cell in the chart matrix in response to the drill operation.

8. The computing device of claim 1, wherein the at least one processor is further configured to output the initial charts in the chart matrix such that the members of the hierarchy of members of the data dimension positioned as the second data dimension in the column header user interface section define horizontally distributed charts in each cell of the chart matrix, wherein each of the horizontally distributed charts corresponds to one of the members of the hierarchy of members of the data dimension positioned as the second dimension in the column header user interface; and the members of the hierarchy of members of the data dimension positioned as a third dimension in the row header user interface section are displayed as vertically extending bars within each of the horizontally distributed charts in each cell of the chart matrix, wherein each of the vertically extending bars corresponds to one of the members of the hierarchy of the data dimension positioned as the third dimension in the row header user interface.

9. A computer program product comprising:

one or more computer-readable tangible storage devices;

program instructions, stored on at least one of the one or more computer-readable tangible storage devices, to output a user interface comprising a row header user interface section, a column header user interface section, and a grid header user interface section, the user interface enabling a user to place selected data dimensions into the row header user interface section, the column header user interface section, and the grid header user interface section;

program instructions, stored on at least one of the one or more computer-readable tangible storage devices, to associate a first grid data dimension with a first position in the grid header user interface section;

program instructions, stored on at least one of the one or more computer-readable tangible storage devices, to associate a first row data dimension with a first position in the row header user interface section, wherein the first row data dimension includes a plurality of members arranged in two or more levels in a hierarchy of members;

program instructions, stored on at least one of the one or more computer-readable tangible storage devices, to associate a first column data dimension with a first position in the column header user interface section, wherein the first column data dimension includes a plurality of members arranged in two or more levels in a hierarchy of members;

program instructions, stored on at least one of the one or more computer-readable tangible storage devices, to associate a second data dimension with a second position in one of the row header user interface section and the column header user interface section, wherein the second data dimension includes a plurality of members arranged in two or more levels in a hierarchy of members;

program instructions, stored on at least one of the one or more computer-readable tangible storage devices, to output a chart matrix having column headers, row headers and a plurality of cells arranged in rows and columns, the chart matrix defined by members of the first row data dimension at a selected level of the hierarchy of members of the first row data dimension and by members of the first column data dimension at a selected level of the hierarchy of members of the first column data dimension, wherein labels associated with members of the first row data dimension at the selected level of the hierarchy of members of the first row data dimension are displayed as row headers for each of the rows of the chart matrix, and wherein labels associated with members of the first column data dimension at the selected level of the hierarchy of members of the first column data dimension are displayed as column headers for each of the columns of the chart matrix, wherein the cells of the chart matrix are defined by intersections of rows defined by the members of the first row data dimension at the selected level of the hierarchy of members of the first row data dimension with columns defined by the members of the first column data dimension at the selected level of the hierarchy of members of the first column data dimension;

program instructions, stored on at least one of the one or more computer-readable tangible storage devices, to output, for each cell in the chart matrix, an initial chart depicting data corresponding to the first grid data dimension for each member of the second data dimension at a selected level of the hierarchy of members of the second data dimension, the initial chart further based on the member of the first row data dimension that defines the row of the cell and on the member of the first column data dimension that defines the column of the cell, wherein outputting the initial chart includes displaying, in each cell in the chart matrix, a first plurality of labels corresponding to members of the second data dimension at the selected level of the hierarchy of members of the second data dimension;

program instructions, stored on at least one of the one or more computer-readable tangible storage devices, to perform a drill operation on a selected member of the second data dimension, wherein performing the drill operation includes selecting a label of the first plurality of labels displayed in each cell of the chart matrix that corresponds to the selected member of the second data dimension to provide a context menu, each label in the first plurality of labels corresponding to a respective member of the members of the second data dimension at the selected level of the hierarchy of members of the second data dimension, the context menu displaying an option in the first row data dimension, an option in the first column data dimension, and an option in the second data dimension, wherein performing the drill operation includes selecting the option in the second data dimension; and program instructions, stored on at least one of the one or more computer-readable tangible storage devices, to output, in response to the drill operation, a modified chart for each cell based on members related to the selected member, wherein the members related to the selected member are one hierarchical level removed from the selected member in the data dimension containing the selected member and wherein outputting the modified chart includes displaying, in each cell in the chart matrix, a second plurality of labels corresponding to the members related to the selected member that are one hierarchical level removed from the selected member in the data dimension containing the selected member.

10. The computer program product of claim 9, wherein the drill operation comprises a drill-down operation, and the members related to the selected member are related by one hierarchical level down from the selected member in the data dimension of the selected member.

11. The computer program product of claim 9, wherein the drill operation comprises a drill-up operation, and the members related to the selected member are related by one hierarchical level up from the selected member in the data dimension of the selected member.

12. The computer program product of claim 9, wherein the selected member is displayed, in response to the drill operation, in the row header user interface section or the column header user interface section.

13. A computing device, comprising:

at least one processor; and at least one memory operably coupled to the at least one processor, wherein the at least one processor is configured to:

output a user interface comprising a row header user interface section, a column header user interface section, and a grid header user interface section, the user interface enabling a user to place selected data dimensions into the row header user interface section, the column header user interface section, and the grid header user interface section;

associate a first grid data dimension with a first position in the grid header user interface section;

associate a first row data dimension with a first position in the row header user interface section, wherein the first row data dimension includes a plurality of members arranged in two or more levels in a hierarchy of members;

associate a first column data dimension with a first position in the column header user interface section, wherein the first column data dimension includes a plurality of members arranged in two or more levels in a hierarchy of members;

output a chart matrix having column headers, row headers and a plurality of cells arranged in rows and columns, the chart matrix defined by members of the first row data dimension at a selected level of the hierarchy of members of the first row data dimension and by members of the first column data dimension at a selected level of the hierarchy of members of the first column data dimension, wherein labels associated with members of the first row data dimension at the selected level of the hierarchy of members of the first row data dimension are displayed as row headers for each of the rows of the chart matrix, and wherein labels associated with members of the first column data dimension at the selected level of the hierarchy of members of the first column data dimension are displayed as column headers for each of the columns of the chart matrix, wherein the cells of the chart matrix are defined by intersections of rows defined by the members of the first row data dimension at the selected level of the hierarchy of members of the first row data dimension with columns defined by the members of the first column data dimension at the selected level of the hierarchy of members of the first column data dimension;

output, within each cell of the chart matrix, an initial chart depicting data corresponding to the first grid data dimension based on the member of the first row data dimension that defines the row of the cell and on the member of the first column data dimension that defines the column of the cell, wherein the initial charts are further based on an additional data dimension placed in an additional position in the row header user interface section or in an additional position in the column header user interface section, wherein the additional data dimension includes a plurality of members arranged in two or more levels in a hierarchy of members, wherein outputting the initial chart includes displaying, in each cell in the chart matrix, a first plurality of labels corresponding to members of the additional data dimension at the selected level of a hierarchy of members of the additional data dimension;

perform a drill operation on a selected member of the additional data dimension, wherein performing the drill operation includes selecting a label of the first plurality of labels displayed in each cell of the chart matrix that corresponds to the selected member of the additional data dimension to provide a context menu, each label in the first plurality of labels corresponding to a respective member of the members of the additional data dimension at the selected level of the hierarchy of members of the additional data dimension, the context menu displaying an option in the first row data dimension, an option in the first column data dimension, and an option in the additional data dimension, wherein performing the drill operation includes selecting the option in the additional data dimension; and output, in response the drill operation, a modified chart for each cell, the modified chart based on members related to the selected member, wherein the members related to the selected member are one hierarchical level removed from the selected member in the data dimension containing the selected member and wherein outputting the modified chart includes displaying, in each cell in the chart matrix, a second plurality of labels corresponding to the members related to the selected member that are one hierarchical level removed from the selected member in the data dimension containing the selected member.

14. The computing device of claim 13, wherein at least three additional data dimensions are placed in additional data dimension positions either as an additional data dimension in the row header user interface section, as an additional data dimension in the column header user interface section, or as an additional data dimension in the grid header user interface section, such that there are at least five data dimensions, the at least one processor further being configured to:

output a plurality of charts within each cell of the chart matrix, wherein the charts within each respective cell of the chart matrix display data for the at least three additional dimensions, corresponding to data defined for that respective cell for the first row data dimension associated with the chart matrix and the first column data dimension associated with the chart matrix.

15. The computing device of claim 14, the at least one processor further being further configured to display horizontally or vertically extending bars corresponding to members of two of the at least three additional dimensions in each chart within each cell of the matrix, and wherein the plurality of charts within each respective cell of the matrix are horizontally or vertically distributed within the respective cell of the matrix in accordance with a third of the at least three additional dimensions.

16. The computing device of claim 13, wherein the at least one processor is further configured to update each cell in the chart matrix in response to the drill operation.

17. The computing device of claim 13, wherein the data dimensions for placing into the row header user interface section, the column header user interface section, and the grid header user interface section comprise a date dimension, a geography dimension, a revenue dimension, a products dimension, and a sales channels dimension, wherein the sales channels dimension comprises non-geographically-defined sales channel categories comprising one or more categories of stores and one or more categories of non-store sales channels.

18. The computing device of claim 13, wherein the at least one processor is further configured to:

provide a user option to select a new data dimension to associate with the row axis or the column axis of the chart matrix; and output, in response to a user input to select a new data dimension to associate with the row edge or the column edge, a modified chart matrix displaying the new data dimension in the row edge or the column edge, respectively.

* * * * *